United States Patent [19]
Muhn

[11] 3,803,685
[45] Apr. 16, 1974

[54] BALL JOINT AND METHOD OF FABRICATION
[75] Inventor: Robert A. Muhn, Fort Wayne, Ind.
[73] Assignee: Tuthill Pump Company, Superior Ball Joint Division, New Haven, Ind.
[22] Filed: Mar. 29, 1972
[21] Appl. No.: 239,142

[52] U.S. Cl. .............................. 29/149.5 B, 287/88
[51] Int. Cl. ............................................ B23p 11/00
[58] Field of Search ........ 29/148.4 B, 149.5 B, 441; 287/85 A, 87, 88

[56] References Cited
UNITED STATES PATENTS

| | | | |
|---|---|---|---|
| 2,309,281 | 1/1943 | Steele | 287/88 |
| 1,266,061 | 5/1918 | Scoville | 29/149.5 B |
| 2,995,813 | 8/1961 | Board, Jr. | 29/441 |
| 2,071,341 | 2/1937 | Hufferd et al. | 287/85 A |
| 2,328,330 | 8/1943 | Edington | 287/85 A |
| 2,478,660 | 8/1949 | Keahey | 287/88 |
| 2,904,874 | 9/1959 | Norton | 29/149.5 B |
| 3,116,539 | 1/1964 | Evans et al. | 29/149.5 B |

Primary Examiner—Richard J. Herbst

[57] ABSTRACT

This invention relates to a ball joint and method of fabrication in which a body is machined to provide therein a part-spherical cavity centrally thereof and two opposed openings, one of these openings being provided with a slot-like portion and the other with a frusto-conical shape. A bearing ball with diametrically opposed parallel flats or sides is passed edgewise through said slot portion and into said cavity where it is retained for swiveling movement. The ball is provided with a diametral bore normal to said sides which receives a reduced diameter end portion of a stud that projects through said frusto-conical opening. Said stud end portion is swaged to secure it to said ball. In the fabrication, a punching operation is utilized to form the slot-like portion, an annular groove being coaxially provided in the wall of said cavity for assuring complete severance of the metal chips resulting from the punching operation.

4 Claims, 7 Drawing Figures

BALL JOINT AND METHOD OF FABRICATION

BACKGROUND OF THE INVENTION

1. FIELD OF THE INVENTION

The invention relates to a ball joint assembly and method of fabricating the same, and more specifically to a ball joint of economical construction and relatively strong.

2. DESCRIPTION OF THE PRIOR ART

Ball joints conventionally incorporate a ball stud fitted into a machined socket in a supporting body, the stud extending through an opening in the body defined by a relatively sharp corner against which the neck of the stud may engage. If such engagement is forceful enough, high stress concentrations at the point of engagement can cause failure of the part. Also, some prior ball joint assemblies conventionally employ the ball and stud as an integral unit, with the socket being more cylindrical than spherical, and either the socket or ball, as desired, being hardened to provide greater wear because of the minimal bearing-contact surface between the ball and socket.

SUMMARY OF THE INVENTION

The present invention provides a frusto-conically shaped opening in the body, which connects with the ball cavity, which may be engaged by the neck of the stud received therein, the taper of the frusto-conical opening and the shape of the neck being so selected as to provide for a surface-to-surface engagement therebetween when the stud is swung to its extreme position. This results in relieving the localized stress concentrations above-mentioned resulting from the engagement of the stud neck with a relatively sharp edge of the stud-receiving opening in the body in prior art structures, whereby greater strength against stud breakage is achieved.

In the method of fabricating the ball joint of this invention, a hole is first drilled through a metallic body, and a part-spherical cavity is formed centrally of the body coaxial with said hole. An annular groove is provided in the wall of the cavity coaxial with said hole. A slot-like portion is formed in one portion of this hole to connect with said cavity, this operation being performed by punching to a depth at which the punch intersects said annular groove. The chips produced by the punching operation are thereby released at the junction of the groove, thereby obviating further operations to remove the same. The portion of the hole on the opposite side of the cavity is formed to a frusto-conical shape. A flat-sided ball is passed edgewise through said slot-like portion into said cavity, the diameter of said ball being substantially the same size as said cavity and the width of said slot-like portion being larger than that of said hole. A bore normal to the flat sides is formed in the ball. A reduced diameter end portion on a stud is passed through the frusto-conical hole into the bore of the ball and secured to the latter by swaging.

It is an object of this invention to provide a ball joint which is simple in design, economical to fabricate, and of greater strength than comparable designs.

It is another object of this invention to provide a ball joint so designed as to minimize the chances of failure of the stud should the latter be swung to an extreme position into engagement with an edge of the encircling hole in the body.

It is another object of this invention to provide a method of fabricating the aforesaid ball joint in a simple, economical, and efficient manner.

The above-mentioned and other features and objects of this invention and the manner of attaining them will become more apparent and the invention itself will be best understood by reference to the following description of an embodiment of the invention taken in conjunction with the accompanying drawings.

Figure 3:
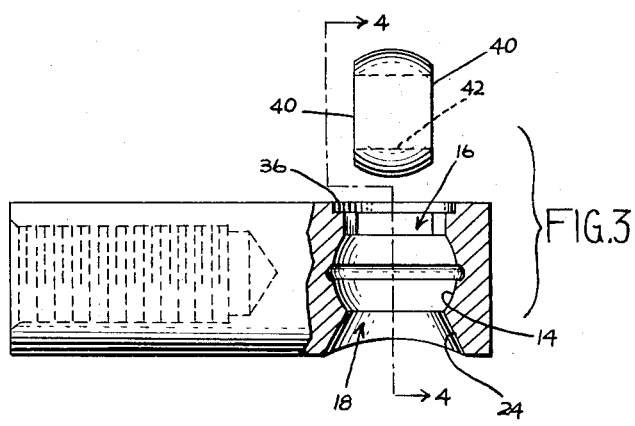
FIG. 3 is a side view partially sectioned of one step in the operation of assembling this invention.
Figure 7:
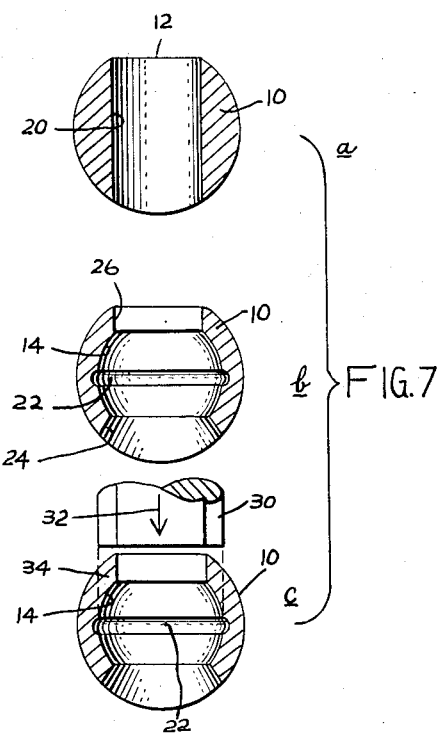
FIG. 7 are cross-sections of the body showing the sequence of certain operations in forming the cavity and openings in the body.

Referring to the drawings, a cylindrical body 10 of cold rolled steel or the like is provided with a flat side 12 parallel to the axis thereof. This body is provided with a centrally disposed, part-spherical cavity 14 and two diametrically opposed openings 16 and 18 (FIG. 3) of a design which will be explained in connection with the method of forming the same as depicted in FIG. 7. In the formation of the cavity 14 and openings 16 and 18, a hole 20 (FIG. 7a) is drilled diametrically through the body 10 normal to the flat side 12 and by use of a recessing tool of conventional design, the part-spherical cavity 14 is machined internally of the body 10 coaxially with the hole 20, an annular groove 22 also coaxial with the hole 20 being formed at about the equator of the cavity 14. The end 18 of the hole 20 is next counterbored coaxially to provide the frusto-conically shaped opening depicted by the numeral 24.

Figure 4:
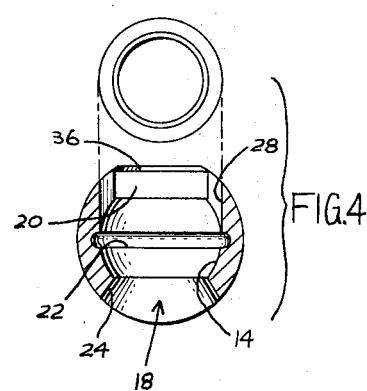
FIG. 4 is a cross-section taken substantially on section line 4—4 of FIG. 3.
Figure 5:
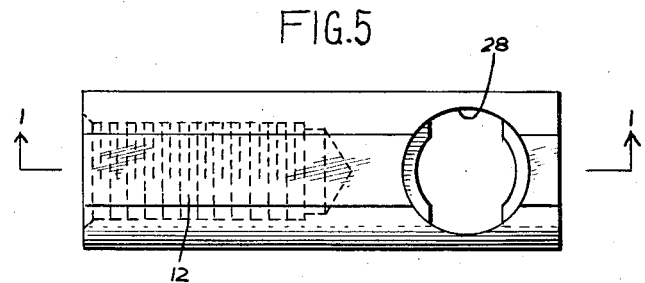
FIG. 5 is a top plan view of the body of FIG. 3 shown in condition to receive the ball.

The portion 16 of the hole 20 is enlarged on diametrically opposite sides to provide a slot portion 28 (FIGS. 4 and 5) cylindrically shaped coaxially with respect of the hole 20. This slot-like portion 28 is produced by a punching operation as illustrated in FIG. 7, a punch 30 of part-cylindrical shape with parallel flat sides being driven downwardly in the direction of the arrow 32 to remove the metal portion indicated by the numeral 34 (FIG. 7b) which intersects the annular groove 22 as shown by the dashed lines in FIG. 7c. Upon the punch 30 reaching the groove 22, the metal shaving cuts completely through and is thereby severed from the body 10, thus obviating any further operation to assure separation of the chips or shavings. The shavings then drop from the body through the opening 24.

Either during the formation of the hole 20 or at any convenient time during the machining operation, the hole 20 adjacent to the flat surface 12 is provided with a shallow enlargement to the diameter of the slot portion 28 thereby providing a part-annular ledge 36 which serves a purpose to be explained hereinafter.

A ball 38 of spherical shape having parallel flat sides 40 is provided with a diametral bore 42 normal to the flat sides 40. The width of the ball 38 is about equal to the width of the slot-like portion 28, while the diameter thereof corresponds to the diameter of the slot 28 and the diameter of the cavity 14. The ball 38 is passed edgewise through the slot 28 into the cavity 14, where it is rotated 90° to coincide substantially to the shape of the cavity 14. As shown more clearly in FIG. 1, the cavity 14 and the ball 38 have substantially identical shapes with just enough clearance being provided therebetween as will permit the ball 38 to swivel freely.

Figure 1:
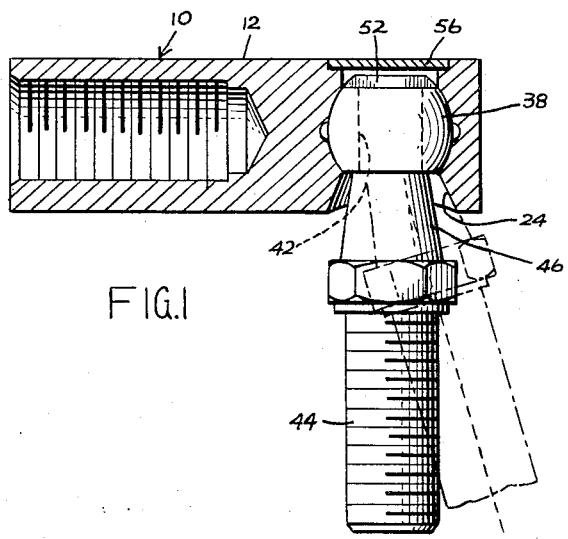
FIG. 1 is a side view of an embodiment of this invention, the body being longitudinally sectioned.
Figure 2:
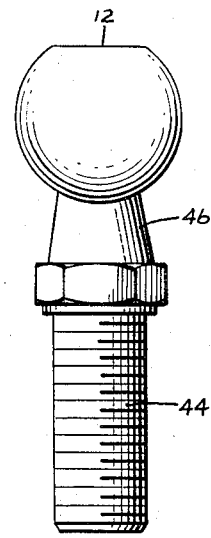
FIG. 2 is an end view thereof.
Figure 6:
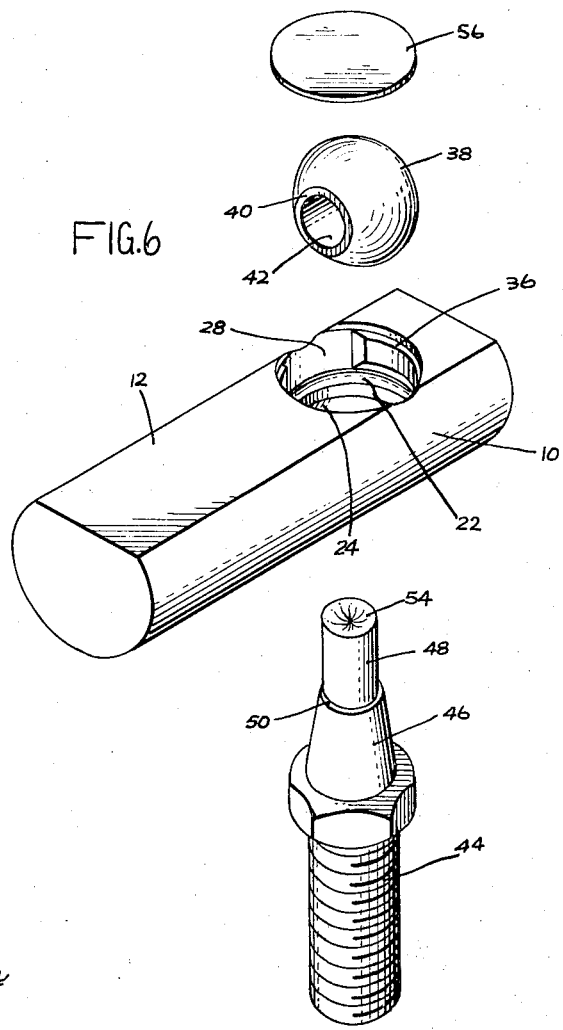
FIG. 6 is an exploded view used in connection with explaining the method of assembling the parts.

An externally threaded stud 44 having a frusto-conically shaped neck 46 and a reduced diameter portion 48 is next inserted into the bore 42 of the ball 38 (FIG. 6). The end portion 48 is formed with a radial shoulder 50 contiguous with the neck 46, and is made long enough to project slightly beyond the upper flat side of the ball 38 as viewed in FIG. 1. This assembly is then placed in a suitable coining machine which is operated to swage over the end 48 thereby forming a head 52 (FIG. 1) in tight engagement with the ball 38, the opposite side of the ball being in firm contact with the shoulder 50. By this means, the ball 38 is firmly secured to the stud 44. Ideally, the end of the reduced portion 48 of the stud is slightly disc shaped at 54 (FIG. 6) such that the swaging operation will produce head 52 of a shape which resembles a continuation of the ball 38, the upper side of this head 52 being flat as shown in FIG. 1. The diameter of the inner end of the conical opening 24 is larger than the neck 46 as shown.

As shown more clearly in FIGS. 1 and 6, a dome shaped, sheetmetal disc 56 having an outer diameter about equal to the diameter of the slot 28 is fitted against the shoulder 36, following which the disc 56 is flattened so as to increase the circumferential dimension thereof and casue it frictionally to engage the wall of the enlarged opening that forms the shoulders 36. This disc 56 thereby serves as a closure plate and is flush with the flat surface 12.

The ball-stud 38, 44 may thus be swiveled within a conical region shown in FIG. 1, the outer extent of this region being limited by engagement of the stud neck 46 with the wall of the conical opening 24. As shown more clearly in FIG. 1, the tapers of the wall 24 and the neck 46 are such that when the stud 44 is moved laterally to engage the wall 24, such engagement is along the surface extents of both the wall 24 and neck 46. Thus any force of engagement is distributed over the surfaces in contact. By means of this surface-to-surface contact, there is less tendency for the stud 44 to break or be otherwise damaged at the neck 46 when it is forced against the surface 24 than would be true in the event the surface 24 were truly cylindrical and the neck portion 46 engaged the circular edge exposed at the surface of the body 10. This edge engagement would produce stress concentrations of high order upon forceful tilting of the stud. Actual experiments have shown that the stud 44 possesses greater strength against damage than prior art designs upon engagement of the neck 46 with the surface area of the opening 24.

By recessing the cavity 14 centrally of the body 10 a substantial surface area for the frusto-conical opening 24 can be provided. It is this area that affords flush surface contact with the neck 46.

Forming the ball joint according to the method above described is economical, and further provides a latitude of design change. For example, the ball 38 on stud 44 may be made of different materials, the ball being hardened and the stud 44 unhardened. The unhardened stud 44 can thereby be made of less frangible material and of greater strength resisting breakage. By making the cavity 14 of spherical shape, a confining bearing surface for the ball is provided, which is of substantial area, wear caused by relative movement being distributed over this entire area. This is in distinct contrast with conventional ball and socket joints in which the balls are normally seated in cylindrical cavities wherein only circles of contact exist between the ball and the cavity which results in substantial localized wear. Use of the closure disc 56 provides a recess which can be packed with grease for providing lubrication. Also, the annular groove 22 can be filled with grease from a grease fitting (not shown) assembled to the body 10 and having a passage leading to the groove 22.

While there have been described above the principles of this invention in connection with specific apparatus, it is to be clearly understood that this description is made only by way of example and not as a limitation to the scope of the invention.

What is claimed is:

1. The method of fabricating a three-part ball joint assembly comprising the steps of drilling a hole through a metallic body, forming a part-spherical cavity centrally of said body coaxial with said hole, forming an annular groove in the wall of said cavity, said groove defining a plane which is normal to the axis of said hole, punching metal from diametrically opposite sides of said hole to a diametral size which intersects said groove thereby forming said hole with a slot-like portion, fitting a flat-sided ball edgewise through said slot-like portion into said cavity, the diameter of said ball being substantially of the same size as said cavity and the width of said slot-like portion but larger than that of said hole, inserting a stud through the opposite hole portion, and securing said stud to said ball.

2. The method of claim 1 including providing said body with a flat side, said slotted hole opening through said flat side, counterboring said hole to a hallow depth to provide a part annular shoulder having an outer diameter substantially equal to the width of said slot, and fitting a dome-shaped disc into said hole in engagement with said shoulder, and flattening said disc to expand it radially into tight frictional engagement with the counterbored wall thereby providing a closure for said hole.

3. The method of claim 1 including providing said ball with a diametral bore which intersects said flat sides at right angles, inserting a portion of said stud into said bore while the ball is in said cavity, and swaging a portion of said stud as extends through said ball into tight engagement therewith.

4. The method of claim 1 including the step of forming said opposite hole portion to a frusto-conical shape.

* * * * *